United States Patent [19]
Hayano

[11] Patent Number: 5,309,205
[45] Date of Patent: May 3, 1994

[54] IMAGE FORMING APPARATUS HAVING MAGNIFICATION ERROR COMPENSATION

[75] Inventor: Yutaka Hayano, Yokohama, Japan

[73] Assignee: Kabushiki Kaisha Toshiba, Kawasaki, Japan

[21] Appl. No.: 945,411

[22] Filed: Sep. 16, 1992

[30] Foreign Application Priority Data

Sep. 17, 1991 [JP] Japan .................. 3-235920

[51] Int. Cl.$^5$ .................................... G03G 15/04
[52] U.S. Cl. .................... 355/243; 346/160; 355/210
[58] Field of Search ............... 355/243, 203, 205, 207, 355/208, 210, 228, 232, 55; 346/160

[56] References Cited

U.S. PATENT DOCUMENTS

| 4,441,805 | 4/1984 | Smith | 355/55 X |
| 4,619,520 | 10/1986 | Araya | . |
| 4,782,361 | 11/1988 | Spinelli et al. | . |
| 5,006,934 | 4/1991 | Hashimoto et al. | 346/160 X |
| 5,105,075 | 4/1992 | Ohta et al. | 250/201.2 |
| 5,117,256 | 5/1992 | Haibara | 355/55 X |

FOREIGN PATENT DOCUMENTS

| 0092342 | 6/1982 | Japan | 355/243 |
| 0174526 | 8/1986 | Japan | 355/243 |
| 61-252761 | 11/1986 | Japan | . |
| 61-252762 | 11/1986 | Japan | . |
| 62-262560 | 11/1987 | Japan | . |

*Primary Examiner*—A. T. Grimley
*Assistant Examiner*—Sandra L. Brasé
*Attorney, Agent, or Firm*—Foley & Lardner

[57] ABSTRACT

An image forming device for forming an image of an original image comprises a device for measuring an error of magnification of an optical system incorporated in the image forming device, and compensating for the size of the image to be formed. Magnification error of the optical device can be compensated for without forming an image on a sheet of paper.

15 Claims, 6 Drawing Sheets

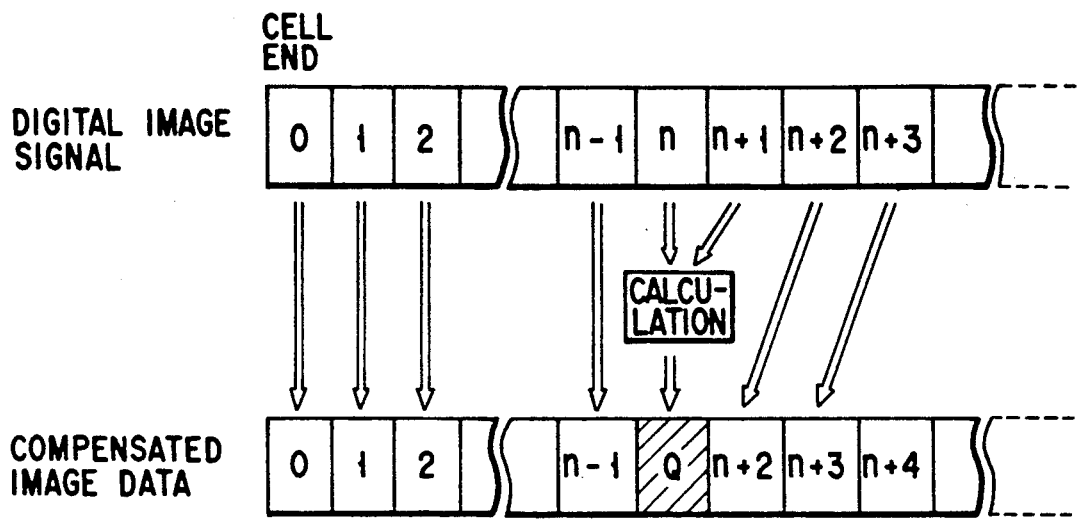
F I G. 4
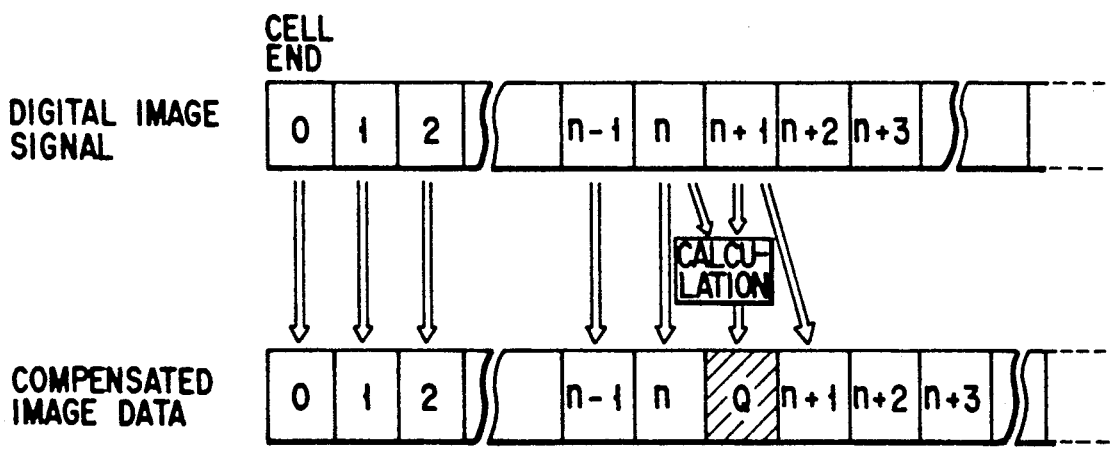
F I G. 5

IMAGE FORMING APPARATUS HAVING MAGNIFICATION ERROR COMPENSATION

BACKGROUND OF THE INVENTION

1. Field of the Invention

The present invention relates to an image forming device, for example, a copying machine for duplicating an image of an original, using a digital processing technique.

2. Description of the Related Art

In an image forming device, a copying machine form an image of an original by thermal transfer, by use of a digital technique. These devices form an image on a sheet of paper whose size is the same as the image of the original. Enlarging or reducing the image of the original and forming such an image on the sheet of paper is sometimes called for.

In this type of copying machine, there are variations of magnification error in individual machines. For example, even if magnification of an image, which is projected on a photoelectric converting element array such as a CCD (charge coupled device) via an optical system, is set to 1.0, distortion due to errors of the optical system, that is, errors of magnification arise. Since such an error of magnification directly influences the image to be formed, it is required that the error of magnification be corrected with high accuracy.

In this adjustment, a difference between an image having an error magnification and an image having no error of magnification is measured by a jig, such as a scale, or by a operator's vision. Then, in order to remove the difference, physical or electrical correction is performed.

Therefore, in the above conventional adjustment of the optical system, since the image is always formed on a sheet of paper and a manual operation is carried out based on the formed image, the following disadvantages occur.

(1) Since the image must be formed at least once, time for forming the image and expendable supplies are needed.

(2) Since the standard of adjustment is easily changed, depending on differences of individual operator's vision, adjustment cannot be uniformly performed and a new variation is further generated.

(3) Since the operation of the adjustment and the image forming for confirming the adjustment result must be repeated so as to perform the adjustment with high accuracy, the time necessary for the operation of adjustment increases.

SUMMARY OF THE INVENTION

A device for scanning an original and forming an image corresponding to the original comprises a photoelectric converting device generating image data corresponding to an incident light, an optical system guiding light sent from the original to the photoelectric converting device, a discriminating section discriminating an error of magnification of the optical system, and a compensating section compensating for the image data based on the result of the discrimination of the discriminating section, wherein the error of magnification of the optical system incorporated in the device is automatically and electrically compensated for.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 4 is a view explaining an interpolation calculation processing of the present invention in a case of magnification in the main scanning direction larger than 1.0;

FIG. 5 is a view explaining the interpolation calculation processing of the present invention in a case of magnification in the main scanning direction smaller than 1.0;

DETAILED DESCRIPTION OF THE PREFERRED EMBODIMENTS

An embodiment of the present invention will be explained with reference to the drawings.

Figure 1:
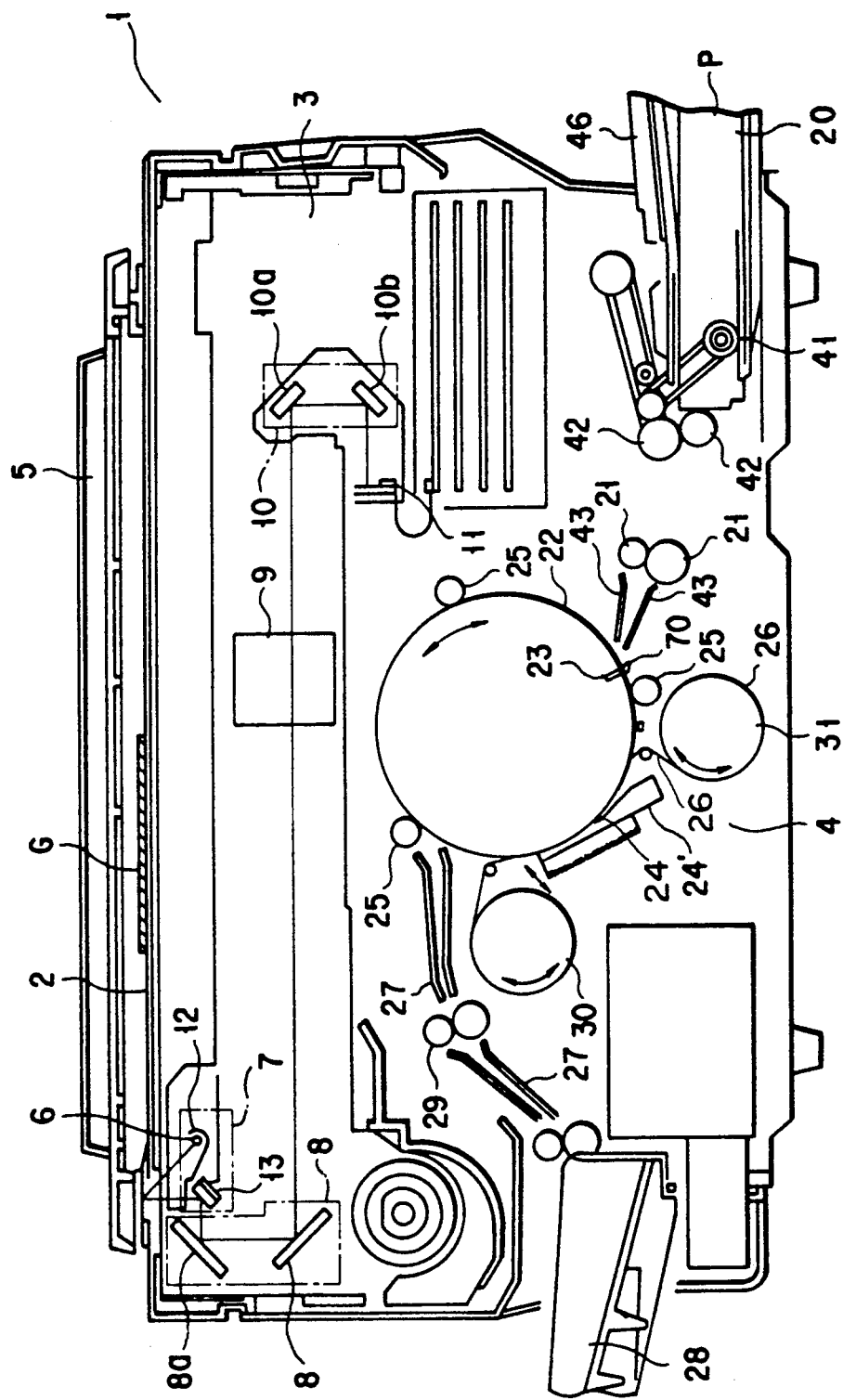
FIG. 1 is a cross sectional view showing the structure of a color copying machine of thermal transfer type according to one embodiment of the present invention.

FIG. 1 shows one example of a color copying machine to which the present invention is applied. However, the present invention is not limited to such a color copying machine. In this drawing, an operation panel (not shown) is provided in a front portion of an upper surface of a main body 1 of the copying machine. The upper section of the main body 1 comprises a scanning section 3 scanning an original G arranged on an original plate 2 (transparent glass), and the lower section comprises an image forming section 4. Reference numeral 5 is a cover for the original which is provided on the original plate 2 to be freely opened and closed.

The original plate 2 is fixed to the main body 1. In the original plate 2, there is a fixing scale (not shown) serving as a reference for setting the original G.

The scanning section 3 comprises a first carriage 7 having an illumination lamp 6 as a light source, a second carriage 8 curving an optical path by mirrors 8a and 8b, a zoom lens 9, a mirror 10, which compensates for the length of the optical path at the time of changing the magnification and guides a reflected light sent from the original G to a photoelectric converter 11 receiving the reflected light sent from the original G, and a driving system (not shown) for changing the position of each section.

The illumination lamp 6 illuminating light to the original G, a reflector 12 collecting light sent from the illumination lamp 6 on the surface of the original, and a mirror 13 guiding the reflected light sent from the original G to the second carriage 8 are mounted on the first carriage 7.

The mirrors 8a and 8b, which sent light guided from the mirror 13 to the zoom lens 9, are mounted on the second carriage 8.

The first and second carriages 7 and 8 are connected to each other by a timing belt (not shown). The second carriage 8 is moved in the same direction as the first carriage 7 at ½ speed of the first carriage 7. Thereby, the original G can be scanned such that the length of the optical path up to the zoom lens 9 is always constant.

A focal distance of the zoom lens 9 is fixed, and moved in a direction of an optical axis when the magnification is varied.

The mirror 10 comprises two mirrors 10a and 10b. The positions of the mirrors 10a and 10b are changed in accordance with the change of the optical path corresponding to a variable magnification (copy magnification) to be selected by an operator. Then, light sent from the zoom lens 9 is guided to the photoelectric converter 11 by curving the optical path by the mirrors 10a and 10b.

The photoelectric converter 11 photoelectrically converts the reflected light sent from the original G, thereby separating and outputting the images of the original G as color signals of light of cyan (C), green (G), yellow (Y), or red (R), Green (G), blue (B). The photoelectric converter 11 comprises, for example, a linear image sensor. In this case, one picture element of the original corresponds to three continuous cells of the sensor. The output of the photoelectric converter 11 is supplied to an A/D converter, to be explained later.

A platen drum 22 is positioned in the substantially central portion of the main body 1, in the image forming section 4. The surfaces of the platen drum 22 are formed of an elastic member such as rubber, and the platen drum 22 functions as a platen roller for a thermal head 24.

The platen drum 22 rotates clockwise, so that a sheet of paper is wound around the platen drum 22 and the sheet of paper is not shifted in overprinting. In other words, the circumference of the platen drum 22 is a little longer than the length of the longitudinal direction of the maximum paper size. Pressing rollers 25 are provided around the platen drum 22 at predetermined distances, so as to prevent the sheet of paper from floating from the platen drum 22. The thermal head 24 is provided in the left lower portion of the platen drum 22. The thermal head 24 is attached to a holder having a heater 24 at its rear portion to form one unit. A heat-melting ink ribbon 26 is provided between the thermal head 24 and the platen drum 22.

On the ink ribbon 26, ink surfaces of three colors, yellow (Y), magenta (M), cyan (C), or four colors, yellow (Y), magenta (M), cyan (C), black (BL), are sequentially arranged in a longitudinal direction of a film. Cores 30 and 31 around which the ink ribbon 26 is wound are coupled to a driving shaft of a motor (not shown) via a driving force transmission mechanism (not shown), and driven to be rotated as required.

On the other hand, a paper feeding roller 41 is provided on the lower right portion of the main body 1, and papers P contained in a paper feeding cassette 20 are taken out one by one. The paper feeding cassette 20 is detachably connected to the side surface of the main body 1.

The papers P, which are taken out by the paper feeding roller 41, are sent to a register roller 21 by a transfer roller 42. The register roller 21 is in the lower portion of the image forming section. The top end portions of the papers P are arranged so that they are transferred to the platen drum 22 by the register roller 21 via a guide 43. The papers P transferred to the platen drum 22 are wound around the platen drum 22 by a gripper 23 and the pressing rollers 25, so that the papers are correctly transferred. Similarly, the papers to be fed from a manual paper feeding device 46 are wound around the platen drum 22.

The gripper 23 is L-shaped, as shown in the drawing, and movably arranged in a radial direction of the platen drum 22 by a spring (not shown) formed on its one end. The length of the gripper 23 is longer than the drum width of the platen drum 22, and claws (not shown) are provided in both ends of the gripper 23.

In the transferring section for transferring the papers P to the platen drum 22, a gripper release claw 70 is provided in a frame of the main body 1 of the copying machine. The claw 70 is movable, and a spring (not shown) is connected thereto. When the platen drum 22 is rotated, the gripper release claw 70 engages the gripper 23. In other words, if the platen drum 22 is rotated counterclockwise and the gripper 23 is worked by the gripper release claw 70, the gripper release claw 70 and the claw of the gripper 23 are engaged with each other, and the gripper 23 is drawn in the anti-central direction of the platen drum 22. Under this state, the papers P to be transferred through the guide 43 are inserted between the drum 22 and the gripper 23. Then, if the platen drum 22 is further rotated, the gripper release claw 70 is detached from the claw of the gripper 23, so that the papers P are held by the drum 22 and the gripper 23. Thereafter, the platen drum 22 is rotated clockwise, and sent to the thermal head 24.

The papers P whose top ends are fixed by the gripper 23 are wound around the platen drum 22 by being rotated clockwise. After the top ends are passed through a printing area, the thermal head 24 is pressurized by the platen drum 22, and printing is performed.

As mentioned above, when the first color printing to the papers P sent to the printing area is finished, the platen drum 22 makes substantially one rotation. At this time, the thermal head 24 is once released, the ink ribbon 26 is wound, and initialization of the next color is performed. Then, the platen drum 22 is started to be rotated clockwise again, and printing due to the thermal head 24 is performed, and the next color printing is carried out.

In the case of the full colors, the multi-color image for yellow, magenta, and cyan can be formed by three operations, and the multi-color images for yellow, magenta, cyan, and black can be formed by four operations. In the case of monochrome, the image can be formed by one operation.

For discharging the papers, the platen drum 22 is rotated clockwise until the rear ends of the papers P reach close to the inlet of a guide 27. Then, if the rear ends of the papers P reach to the inlet of the guide 27, the platen drum 22 is rotated counterclockwise, so that the rear ends of the papers P are separated from the platen drum 22 by a separation claw (not shown), and guided to the discharge guide 27. Moreover, when the gripper 23 passes through the transferring section, the top ends of the papers P are released from the gripper 23 by, for example, the gripper release claw 70.

The top ends of the papers P are released from the gripper 23 and the papers P are transferred by the paper discharge guide 27. Thus, duplication is carried out. Then, papers P are discharged to a paper discharge tray 28 after re-melting and penetration in synchronism with the rotation of the platen drum 22.

Figure 2:
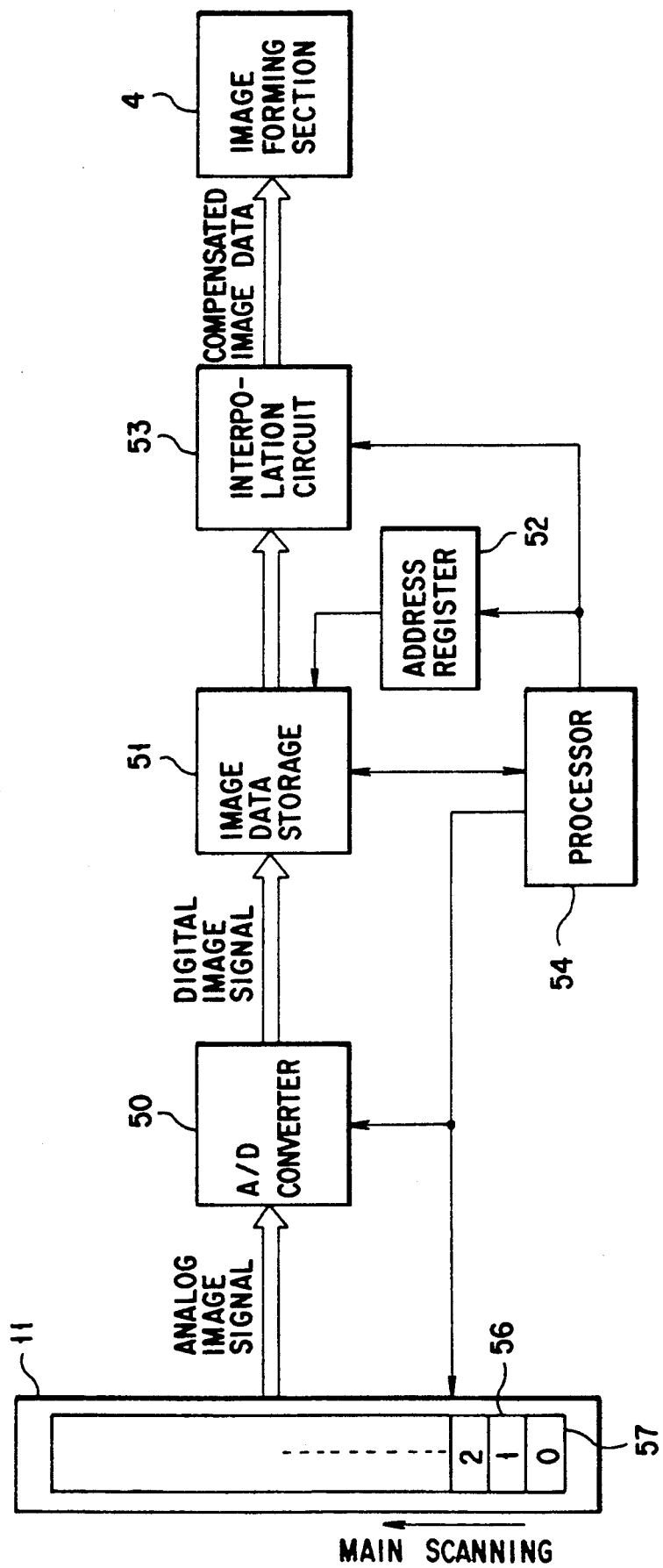
FIG. 2 is a block diagram showing the structure of an electric circuit according to the present invention.
Figure 3:
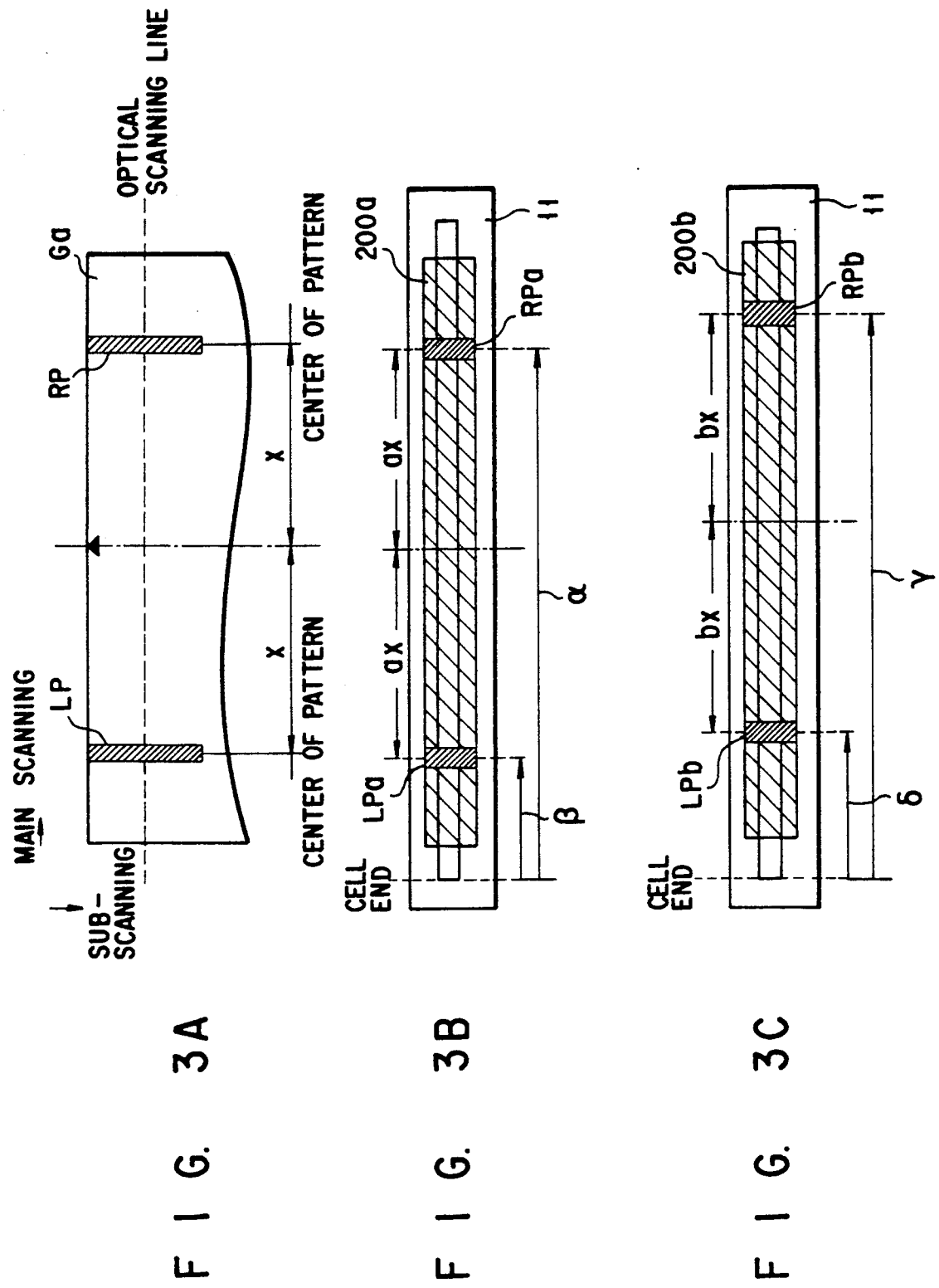
FIGS. 3A, 3B, and 3C are views explaining a method of the present invention for obtaining a value of an error of magnification in a main scanning direction.
Figure 6:
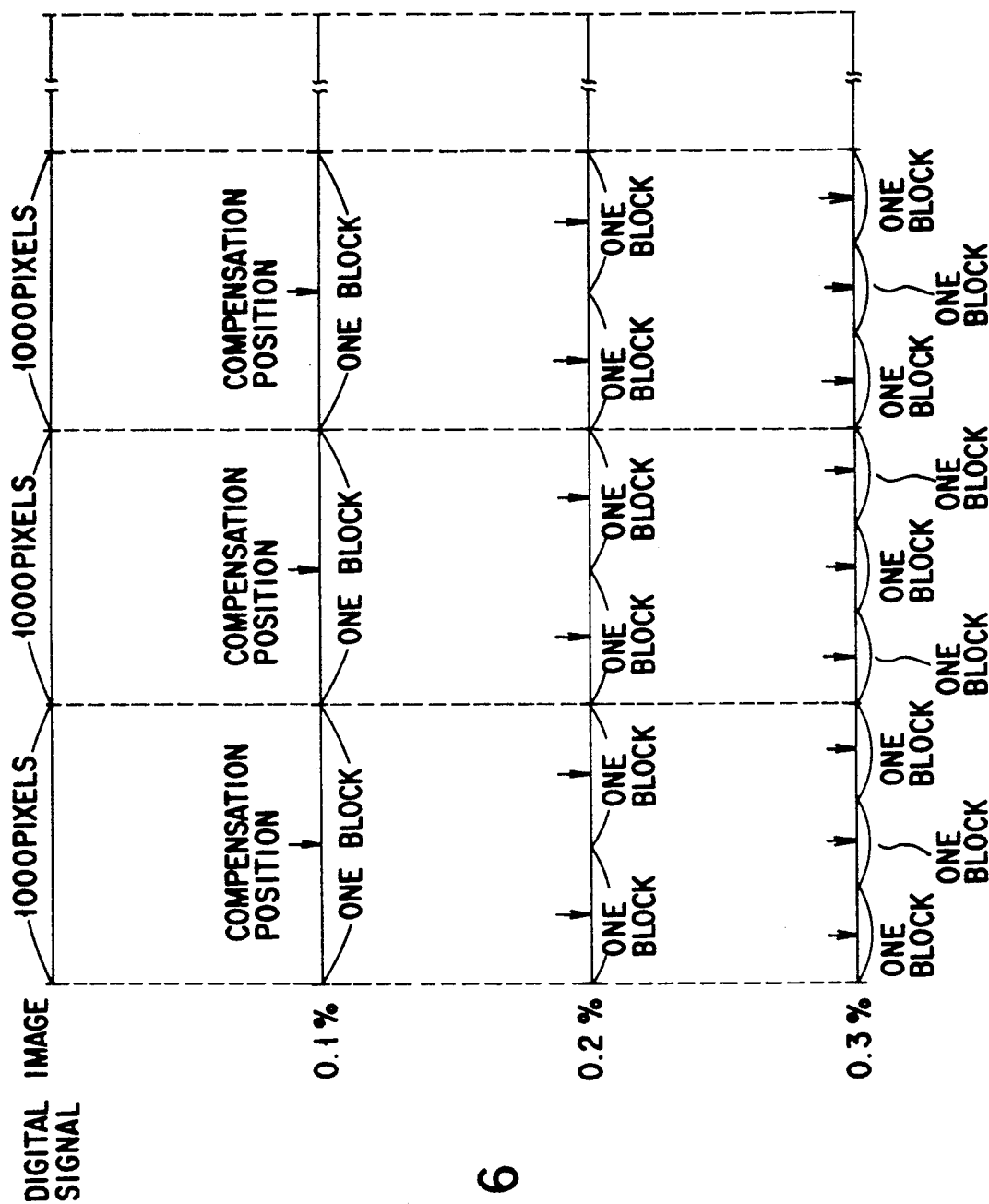
FIG. 6 is a view explaining the position of pixels to be compensated in the interpolation calculation processing of the present invention.
Figure 7:
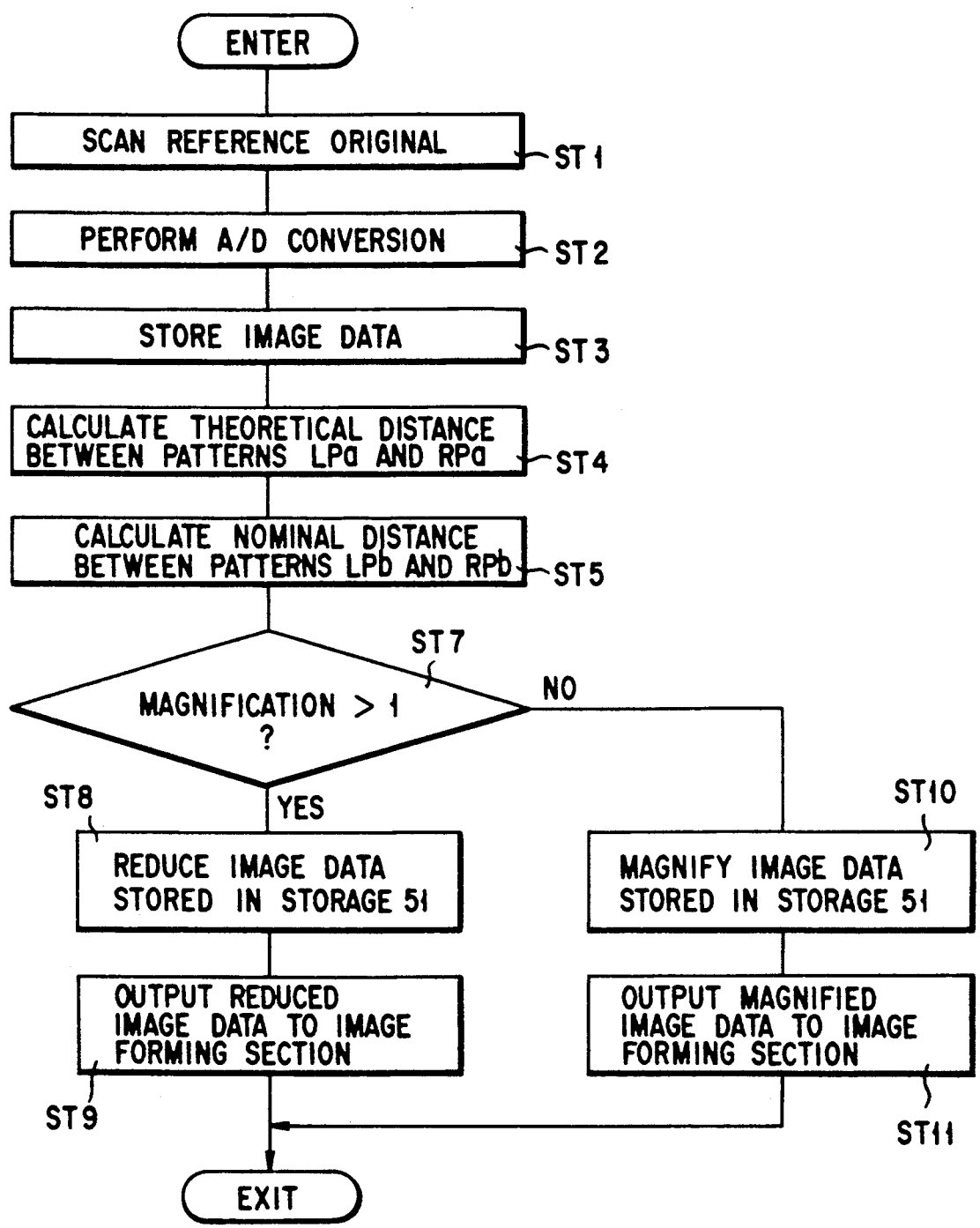
FIG. 7 is a flow chart showing the operation of the interpolation calculation processing the present invention.

FIG. 2 shows the main part of an electric circuit.

The photoelectric converter 11 is a linear image sensor having thousands of photoelectric converting cells 56 arranged on a line. The image of the original projected on the sensor is scanned in the main scanning direction, and the image is read. The A/D converter 50 converts an output analog image signal of the photoelectric converter 11 into a digital image signal. An image data storage 51 sequentially stores the digital image signal sent from the A/D converter 50. Therefore, scanning image data of the image of the original scanned by the photoelectric converter 11 is digitally stored in the image data storage 51. In an address register 52, data output starting address, used when the digital image signal stored in the image data storage 51 is read out, is recorded. An interpolation circuit 53 interpolates the digital image data read out from the image data storage 51. The image forming section 4 forms the image based on image data compensated by the interpolation circuit 43.

A processor 54 controls the reading or writing digital image data from/to the image data storage 51, the setting of the data output starting address to the address register 52, and the instruction of the calculation to the interpolation circuit 53. Also, the processor 54 gives instructions for calculation and recording of the calculation parameters for compensating for magnification error in the main scanning direction due to the optical system such as the zoom lens 9 to the interpolation circuit 53.

Therefore, at the time of adjustment, the value of the error of magnification of the optical system is discriminated with reference to reference digital image data, which is obtained by reading the reference original, in the image data storage 51. In other words, the processor 54 calculates (that is, holds), in advance, the position of line patterns in the reference original image, which would be projected on the cells 56 of the photoelectric converter 11 by use of the copying machine having an ideal optical system, that is, there is no error of magnification in the main scanning direction. Then, the processor 54 compares the positions of the cells 56 in the photoelectric converter 11 showing the positions of the line patterns of the reference original image, which are actually projected on the photoelectric converter 11, with the positions of the ideal line patterns. Then, the magnification error of the optical system is calculated based on the result of the comparison.

The method for obtaining the specific value of the error of magnification in the main scanning direction by use of the processor 54 will be explained with reference to FIGS. 3 to 6 and 7.

FIG. 3A shows a reference original Ga. In the reference original Ga, the same thick straight line patterns LP and RP are drawn at the positions, which are respectively separated right and left from the center of the main scanning direction by distance x.

At the time of adjusting the magnification, the reference original document Ga is arranged so as to meet a predetermined mounting position on the original plate 2. Then, the original Ga is scanned along an optical scanning line (broken line) crossing at right angles the straight line patterns LP and RP (step 1 of FIG. 7). In the case of this adjustment, the image forming operation is not performed.

FIG. 3B shows an optical image 200a, which is projected on the photoelectric converter 11 when the reference original Ga would be scanned by an ideal optical system having no optical error of magnification.

In this case, the image on the original Ga is projected on the photoelectric converter 11 as an optical signal corresponding to the straight line patterns LP and RP. The analog output of the photoelectric converter 11 is converted into a digital image signal by the A/D converter 50 (step 2). Thereafter, the digital image signal is stored in the image data storage 51 (step 3). Digital image data stored in the storage 51 shows an electric level in accordance with the intensity of the optical signal, and the processor 54 discriminates the image based on the difference in the levels.

For obtaining the value of the error of magnification in the main scanning direction, the theoretical distance (number of cells) 2ax between the patterns LP and RP is calculated, based on the optical image 200a, which would be projected on converter 11 by use of the ideal optical system having no error of magnification (step 4).

In this case, a line image which is spaced from the cell end (a large number of cells ar provided) is RPa, and a line image which is near the cell end (a small number of pixels is provided) is LPa. The number of cells provided from the cell end to the center of the line image RPa is $\alpha$, and the number of cells, which is provided from the cell end to the center of the line image LPa is $\beta$. The distance between the line images LPa and RPa, that is the sum 2ax of the distance ax which is from the center of the right line image RPa to the center of the optical image 200a, and the distance ax which is from the center of the left line image LPa to the center of the optical image 200a, can be obtained from an equation, $\alpha - \beta$ (number of cells).

In actuality, the distance 2ax between the line images LPa and RPa can be theoretically obtained based on optical characteristic values of the optics involved, such as the zoom lens 9.

Additionally, the distance 2ax between the line image LPa and RPa differ, depending on the type of machine, is calculated by the processor 54.

FIG. 3C shows an optical image 200b obtained by that the reference original Ga, which is scanned along the optical scanning line shown by a broken line of FIG. 3A, is projected on the photoelectric converter 11 through the actual optics, with an optical error of magnification. Therefore, the size of the optical image 200a is different from that of the optical image 200b. For obtaining the value of the error of magnification in the scanning direction of the distorted optical image 200b, the nominal distance 2bx between images RPb and LPb of the patterns LP and RP is first calculated (step 5).

In this embodiment, the line image which is apart from cell end 57 (a large number of cells are provided) is RPb, and the line image (a small number of cells are provided) which is close to the cell end is LPb. The number of cells provided from the cell end to the center of the line image RPb is $\gamma$, and the number of cells provided from the cell end to the center of the line image LPb is $\delta$. The distance between the line images LPb and RPb, that is the sum 2bx of the distance bx, i.e. from the center of the right line image RPb to the center of the optical image 200b, and the distance bx which is from the center of the left line image LPb to the center of the optical image 200b, can be obtained from an equation, $\gamma - \delta$ (the number of pixels). In this way, the value of the error of magnification in the scanning direction can be obtained by calculating the nominal distance 2bx between the projected images RPb and LPb of the reference patterns LP and RP.

The term "magnification" used in this embodiment is defined as a ratio of the nominal distance 2bx between the images RPb and LPb projected through the actual optical system which has the error of magnification to the theoretical distance 2ax between the projected images LPa and RPa having no error of magnification. Therefore, the magnification in the main scanning direction is $2bx/2ax = (\gamma - \delta)/(\alpha - \beta)$.

Sequentially, the interpolation circuit 53 performs the interpolation calculation processing. The interpolation circuit 53 discriminates whether the magnification in the main scanning direction is larger than 1 (magnification in the scanning direction >1) or smaller than 1 (magnification in the scanning direction <1) (step 7).

The case of the magnification in the main scanning direction being >1 shows that the image projected on the photoelectric converting element 56 is larger than the image (real image) formed on the original Ga. In this case, the instruction for calculation of the reduction is outputted from the processor 54. Therefore, the interpolation circuit 53 reduces digital image data stored in the image data storage 51 (step 8), and outputs the reduced image data to the image forming section 4 (step 9). In other words, as shown in FIG. 4, a new pixel value (interpolation data) Q is generated by the calculation of the nth pixel value from the cell end 57 and the n+1st pixel value from the cell end 57 (to be explained later). The generated value Q is outputted from the interpolation circuit 53 in place of the above two pixel values of the nth and n+1st values. As a result, the distance for one pixel is reduced by each calculation and substitution of pixels, so that the image can be reduced.

The new pixel value Value Q can be obtained from the following equation:

$$\text{Value } Q = (\text{Value } (n) + \text{Value } (n+1))/2$$

wherein the nth pixel value from the cell end 57 is Value (n) and the n+1st pixel value from the cell end 57 is Value (n+1).

For example, if each scanning line data is divided into 1000 pixel unit, and the desired number of times of the calculation and data substitution operation in each 1000 pixels at the time of the reduction operation can be shown by the following equation:

the number of times of calculation and substitution$_{1000}$ = extra number of pixels in 1000 pixels =

(magnification) × 1000 − 1000.

Further, the desired pixel distance for performing the calculation and substitution operation in each 1000 pixels can be obtained by the following equation:

the pixel distance for performing the calculation and substitution operation = 1000/(extra number of pixels in 1000 pixels).

For example, if the magnification is 1.001, one calculation and a substitution operation are performed every 1000 pixels, so that the compensation of −0.1% magnification in the main scanning direction can be carried out.

On the other hand, in the case that the projected image is smaller than the real image of the original Ga (magnification <1), image data to be outputted from the image data storage 51 is also reduced than the real image. In this case, the processor 54 outputs the instruction of the calculation of magnification to the interpolation circuit 53. The interpolation circuit 53 magnifies digital image data read from the image data storage 51 (step 9), and outputs magnified image data to the image forming section 4 (step 10).

In other words, in the case of the magnification in the main scanning direction <1, as shown in FIG. 5, a new pixel value (interpolation data) Q is generated from nth pixel value from the cell end 57 and n+1st pixel value from the cell end 57 by the above-mentioned equation. The generated pixel value Q is inserted between two values of the nth pixel value and the n+1st, and outputted. As a result, a distance for one pixel can be determined by one calculation and data supplementary operation, and the image can be magnified.

Moreover, the desired number of times of the calculation and data substitution operation in each 1000 pixels at the time of the magnification operation can be shown by the following equation:

the number of calculations and substitutions 1000 = insufficient number of pixels in 1000 pixels =

1000 − (magnification) × 1000

Further, the desired pixel distance for performing the calculation and substitution operation in each 1000 pixels can be obtained by the following operation:

the distance of the calculation and supplementary pixels =

1000/(insufficient number of pixels in 1000 pixels).

For example, if the magnification is 0.999, one calculation and data supplementary operation are performed every 1000 pixels, so that the compensation of +0.1% magnification in the main scanning direction can be carried out.

The digital image signal substituted by interpolation data or digital image signal to which interpolation data is added is sent to the image forming section 4 as compensated image data. An image having no error of magnification can be formed.

Therefore, according to the present invention, the error of magnification in the main scanning direction of the optical system can be compensated for without actually forming the image.

The above embodiment explains the case in which compensation is made by 0.1% unit. However, the present invention is not limited to 0.1% unit. The compensation may be made by a 0.2% unit or a 0.3% unit.

In the case that compensation is made by 0.1%, 1000 pixels of the digital image signal are used as one block, and interpolation data is generated by use of the image values of nth and n+1st (for example, central portion, head portion or tail portion) of each block shown by an arrow in the drawing, and the compensation position is not limited.

Similarly, in the case that the compensation is made by 0.2%, 500 pixels of the digital image signal are used as one block, and interpolation data is generated by use of pixel data of the peripheral position corresponding to each block, so that compensation of a larger value can be made.

Similarly, in the case that the compensation is made by 0.3%, 333 (or 334) pixels of the digital image signal are used as one block, and interpolation data are generated by use of pixel data of the same peripheral position of each block.

Additional advantages and modifications will readily occur to those skilled in the art. Therefore, the invention in its broader aspects is not limited to the specific details, representative devices, and illustrated example shown and described herein. Accordingly, various modifications may be made without departing from the spirit or scope of the general inventive concept as defined by the appended claims and their equivalents.

What is claimed is:

1. An image forming apparatus for forming an image on an image forming medium corresponding to an original, comprising:
   means for photoelectrically receiving incident light provided via said original;
   means for generating image data corresponding to said incident light;
   optical means, positioned between said original and said receiving means, for guiding light sent from said original to said receiving means, said optical means guiding the light with a predetermined magnification corresponding to the position of said optical means;
   means for compensating for said image data so as to change the modification without changing the position of said optical means; and
   means for forming an image in accordance with image data compensated by said compensating means on said image forming medium.

2. The image forming apparatus according to claim 1, wherein said discriminating means includes means for discriminating the error of magnification of said optical means by comparing a nominal size of a predetermined pattern in said image data obtained by scanning said predetermined pattern on said original by use of said optical means with a theoretical size of said pattern to be obtained by scanning said pattern by use of an ideal optical system having no error of magnification, and wherein said compensating means reduces said image data and outputs said reduced image data to said image forming means when said nominal size of said pattern is larger than said theoretical size of said pattern, and said compensating means magnifies said image data and outputs said magnified image data to said image forming means when said nominal size of said pattern is smaller than said theoretical size of said pattern.

3. The image forming apparatus according to claim 2, wherein said compensating means includes first compensating means for dividing each scanning line data in said image data into a plurality of blocks each having a predetermined number of pixels, generating a new pixel value from nth pixel value and n+1st pixel value in each block, and substituting said nth pixel value and n+1st value for said one new pixel value when it is inputted from said discriminating means that said nominal size of said pattern is larger than said theoretical size of said pattern, and second compensating means for dividing each scanning line data in said image data into a plurality of blocks each having a predetermined number of pixels, generating a new pixel value from nth pixel value and n+1st pixel value in each block, and inserting pixels having said new pixel value between said nth pixel value and n+1st value when said nominal size of said pattern is smaller than said theoretical size of said pattern.

4. The image forming apparatus according to claim 3, wherein value (Q) generated by said first compensating means and second compensating means can be obtained by the following equation:

$$\text{Value }(Q) = \{\text{Value }(n) + \text{Value }(n+1)\}/2$$

wherein Value (n) is a nth pixel value and Value (n+1) is a n+1st pixel value.

5. An image forming appraatus according to claim 1, further comprising means for discriminating an error of magnification of said optical means, wherein said compensating means compensates for a magnification of said image data based on the result of the discrimination of said discrimbinating means.

6. An image forming apparatus according to claim 5, wherein said discriminating means further comprises means for comparing a nominal size obtained from a reference pattern on said original through the optical means and the receiving means, with theoretical size obtained from the reference pattern through an optical means and a receiving means which have no magnification error.

7. An image forming apparatus for forming an image corresponding to an original on a sheet of paper, comprising:
   an image sensor for generating an electric signal corresponding to the intensity of light to be inputted;
   an optical device, positioned between said original and said image sensor, for guiding light sent forms aid original to said image sensor, said optical device guiding the light in a predetermined magnification corresponding to the position of said optical device;
   an A/D converter for digitizing said electric signal and generating image data;
   a memory for storing said image data;
   means for compensating for the image data stored in said memory so as to change the magnification without changing the position of said optical device; and
   means for forming an image by use of image data compensated by said compensating means.

8. The image forming apparatus according to claim 7, wherein said discriminating means includes means for calculating a theoretical size of a reference pattern to be obtained by scanning said reference pattern on said original by use of an ideal optical system having no error of magnification, means for calculating a nominal size of said reference pattern in image data stored in said memory obtained by scanning said reference pattern on said original by use of an actual optical system having error of magnification, and means for comparing said theoretical size of said reference pattern with said nominal size of said pattern, and wherein said compensating means includes means for reducing said image data in said memory and outputting said reduced image data to said image forming means when said nominal size of said pattern is larger than said theoretical size of said pattern, and for magnifying said image data and outputting said magnified image data to said image forming means when said nominal size of said pattern is smaller than said theoretical size of said pattern.

9. The image forming apparatus according to claim 7, wherein said compensating means includes first compensating means for dividing each scanning line data of said image data stored in said memory into a plurality of blocks each having a predetermined number of continuous pixels, generating a new pixel value from nth pixel value and n+1st pixel value in each block, substituting said nth pixel value and n+1st value for said one new pixel value when it is inputted from said discriminating means that said nominal size of said pattern is larger than said theoretical size of said pattern, and second compensating means for dividing each scanning line data of said image data stored in said memory into a plurality of blocks each having a predetermined number of continuous pixels, generating a new pixel value from nth pixel value and n+1st pixel value in each block and inserting pixels having said new pixel value between said nth pixel value and n+1st value when said nominal size of said pattern is smaller than said theoretical size of said pattern.

10. An image forming apparatus according to claim 9, wherein value (Q), generating by said first compensating means and second compensating means, can be obtained by the following equation:

$$\text{Value }(Q) = (\text{Value }(n) + \text{value }(n+1))/2$$

wherein Value (n) is a nth pixel value and Value (n+1) is an n+1st pixel value.

11. An image forming apparatus according to claim 7, further comprising means for discriminating an error of magnification of said optical means, wherein said compensating means cooperates for the magnification of said image data stored in the memory based on the result of discrimination of said discriminating means.

12. The image forming apparatus according to claim 11, wherein said discriminating means further comprising means for comparing a nominal size obtained from a reference pattern on said original through the optical means and the reference pattern through an optical means and a receiving means which have no magnification error.

13. An image forming apparatus for forming an image corresponding to an original, comprising:
means for photoelectrically receiving an incident light provided via said original;
means for generating image data corresponding to said incident light which said receiving means receives;
optical means for guiding light sent from said original to said receiving means;
means for discriminating an error of magnification of said optical means, including means for discriminating the error of magnification of said optical means by comparing the nominal size of a predetermined pattern in said image data obtained by scanning said predetermined pattern on said original by use of said optical means with the theoretical size of said pattern obtained by scanning said pattern by use of an ideal system having no error of magnification;
means for compensating for said image data based on the result of discrimination of said discriminating means, wherein said compensating means includes first compensating means for dividing each scanning line data in said image data into a plurality of blocks each having a predetermined number of pixels, generating a new pixel value from the nth pixel value and the n+1st pixel value in each block, and substituting said nth pixel and n+1st value for said one new pixel value when it is inputted from said discriminating means that said nominal size of said pattern is larger than said theoretical size of said pattern, and second compensating means for dividing each scanning line data is said image data into a plurality of blocks each having a predetermined number of pixels, generating a new pixel value from nth pixel value and n+1st pixel value in each block, and inserting pixels having said new pixel value between said nth pixel value and n+1st value when said nominal size of said pattern is smaller than said theoretical size of said pattern; and
means for forming an image by use of image data compensated by said compensating means.

14. An image forming apparatus for forming an image corresponding to an original, comprising:
means for photoelectrically receiving an incident light provided via said original;
means for generating image data corresponding to said incident light which said receiving means receives;
optical means for guiding light sent from said original to said receiving means;
means for discriminating an error of magnification of said optical means, including means for discriminating the error of magnification of said optical means by comparing the nominal size of a predetermined pattern in said image data obtained by scanning said predetermined pattern on said original by use of said optical means with a theoretical size of said pattern to be obtained by scanning said pattern by use of an ideal optical system having no error of magnification;
means for compensating for said image data based on the result of discrimination of said discriminating means, wherein said compensating means includes first compensating means for dividing each scanning line data in said image data into a plurality of blocks each having a predetermined number of pixels, generating a new pixel value from the nth pixel and n+1st pixel value in each block, and substituting said nth pixel value and n+1st value for said one new pixel value when it is inputted from said discriminating means that said nominal size of said pattern is larger than said theoretical size of said pattern, and second compensating means for dividing each scanning line data in said image data into a plurality of blocks each having a predetermined number of pixels, generating a new pixel value from the nth pixel value and n+1st pixel value in each block, and inserting pixels having said new pixel value between said nth pixel value and n+1st value when said nominal size of said pattern is smaller than said theoretical size of said pattern, and wherein said new pixel value, represented as Value (QW), generated by said first compensating means and second compensating means can be obtained by the following equation:

$$\text{Value }(Q) = \{\text{Value }(n) + \text{Value }(n+1)\}/2$$

wherein Value (n) is a nth pixel value and Value (n+1) is a n+1st pixel value; and
means for forming an image by use of image data compensated by said compensating means.

15. An image forming apparatus for forming an image corresponding to an original on a sheet of paper, comprising:
an image sensor for generating an electric signal corresponding to the intensity of light to be inputted;

an optical device for guiding the light sent from said original to said image sensor;

an A/D converter for digitizing said electric signals and generating image data;

a memory for storing said image data;

means for discriminating an error of magnification of said optical device, including means for calculating a theoretical size of a reference pattern to be obtained by scanning said reference pattern on said original by use of an ideal optical system having no error of magnification, means for calculating a nominal size of said reference pattern in image data stored in said memory obtained by scanning said reference pattern on said original by use of an actual optical system having error of magnification, and means for comparing said theoretical size of said reference pattern with said nominal size of said pattern, and wherein said compensating means includes means for reducing said image data in said memory and outputting nominal size of said pattern is larger than said theoretical size of said pattern, and for magnifying said image data and outputting said magnified image data to said image forming means when said nominal size of said pattern is smaller than said theoretical size of said pattern;

means for compensating for said image data stored in said memory based on the result of discrimination by said discriminating means, wherein said compensating means includes first compensating means for dividing each scanning line data of said image data stored in said memory into a plurality of blocks each having a predetermined number of continuous pixels, generating a new pixel value from the nth pixel and n+1st pixel value in each block, substituting said nth pixel and n+1st value for said one new pixel value when it is inputted from said discriminating means that said nominal size of said pattern on said original by use of an ideal optical system having no error of magnification, means for calculating a nominal size of said reference pattern in image data stored in said memory obtained by scanning said reference pattern on said original by use of an actual optical system having an error of magnification, and means for comparing said theoretical size of said reference pattern with said nominal size of said pattern, and wherein said compensating means includes means for reducing said image data in said memory and outputting said reduced image data to said image forming means when said nominal size of said pattern is larger than said theoretical size of said pattern, and for magnifying said image data and outputting said magnified image data to said image forming means when said nominal size of said pattern is smaller than said theoretical size of said pattern; and means for forming an image by use of image data compensated by said compensated means.

* * * * *